(12) United States Patent
Chu et al.

(10) Patent No.: US 10,698,679 B2
(45) Date of Patent: Jun. 30, 2020

(54) SERVER WITH DOUBLE-FIRMWARE STORAGE SPACE AND FIRMWARE UPDATE METHOD THEREFOR

(71) Applicant: MITAC COMPUTING TECHNOLOGY CORPORATION, Taoyuan (TW)

(72) Inventors: Hung-Lu Chu, Taoyuan (TW); Yu-Jui Lu, Taoyuan (TW)

(73) Assignee: MITAC COMPUTING TECHNOLOGY CORPORATION, Taoyuan (TW)

( * ) Notice: Subject to any disclaimer, the term of this patent is extended or adjusted under 35 U.S.C. 154(b) by 76 days.

(21) Appl. No.: 16/014,788

(22) Filed: Jun. 21, 2018

(65) Prior Publication Data
US 2019/0079748 A1 Mar. 14, 2019

(30) Foreign Application Priority Data
Sep. 12, 2017 (TW) .............................. 106131307 A

(51) Int. Cl.
| | |
|---|---|
| *G06F 8/654* | (2018.01) |
| *G06F 3/06* | (2006.01) |
| *G06F 11/30* | (2006.01) |
| *G06F 11/14* | (2006.01) |

(52) U.S. Cl.
CPC .......... *G06F 8/654* (2018.02); *G06F 3/0614* (2013.01); *G06F 3/0653* (2013.01); *G06F 3/0673* (2013.01); *G06F 11/3031* (2013.01); *G06F 11/3058* (2013.01); *G06F 11/1433* (2013.01)

(58) Field of Classification Search
CPC ...... G06F 8/654; G06F 3/0614; G06F 3/0653; G06F 3/0673; G06F 11/3031; G06F 11/3058; G06F 11/1433

USPC ......................................................... 717/168
See application file for complete search history.

(56) References Cited

U.S. PATENT DOCUMENTS

| | | | | |
|---|---|---|---|---|
| 2011/0179407 | A1* | 7/2011 | Minegishi | G06F 8/65 717/168 |
| 2013/0007430 | A1* | 1/2013 | Fan | G06F 8/654 713/1 |

FOREIGN PATENT DOCUMENTS

TW 201207731 A 2/2012

OTHER PUBLICATIONS

Taiwan Patent Office, Office Action, Patent Application Serial No. TW106131307, dated May 8, 2018, Taiwan.

* cited by examiner

*Primary Examiner* — Wei Y Zhen
*Assistant Examiner* — Mohammed N Huda
(74) *Attorney, Agent, or Firm* — Rabin & Berdo, P.C.

(57) ABSTRACT

A server with a double-firmware storage space and a firmware update method therefor are provided. The server includes a baseboard management controller (BMC) with a control module and an update module, a selection circuit, a first storage circuit, and a second storage circuit. The control module executes a first firmware program from the first storage circuit. The update module stores a second firmware program in the second storage circuit according to a firmware update instruction when the control module executes the first firmware program. The BMC resets after the second firmware program is stored in the second storage circuit. After the BMC is reset, the control module obtains the second firmware program from the second storage circuit and executes the second firmware program.

18 Claims, 4 Drawing Sheets

SERVER WITH DOUBLE-FIRMWARE STORAGE SPACE AND FIRMWARE UPDATE METHOD THEREFOR

CROSS-REFERENCE TO RELATED APPLICATION

This non-provisional application claims priority under 35 U.S.C. § 119(a) to Patent Application No. 106131307 filed in Taiwan, R.O.C. on Sep. 12, 2017, the entire contents of which are hereby incorporated by reference.

BACKGROUND

Technical Field

The present invention relates to a server with a double-firmware storage space and a firmware update method therefor.

Related Art

Most servers include a baseboard management controller (BMC). A control module of the BMC can execute firmware to directly or indirectly monitor and control most of hardware units in a server. For example, a server includes a fan unit. The BMC can monitor a system temperature and control a speed of the fan according to the system temperature. When the temperature is relatively high, the BMC controls the fan to run at a relatively high speed. When the temperature is relatively low, the BMC controls the fan to run at a relatively low speed. The BMC plays an important role in the server.

In some cases, the firmware may need to be updated, for example, some severe problems may occur on the server and cause the server to be malfunctioned or crashed. However, the control module of the BMC cannot monitor other units of the server at the same time during update of the firmware, that is, the control module of the BMC needs to stop a monitoring operation and then switch to execute a firmware update operation when the firmware is being updated. Because the firmware update operation is very time-consuming, the control module of the BMC cannot monitor other components in a relatively long time period. Once a severe problem, such as a system temperature exceeds a threshold value or a system fan is malfunctioned, occurred on the server during update of the firmware, the control module of the BMC will not be aware, and therefore the server might be damaged out of that.

SUMMARY

In view of this, the present invention provides a server with a double-firmware storage space and a firmware update method therefor.

In an embodiment, a server with a double-firmware storage space includes a first storage circuit, a second storage circuit, a selection circuit, and a BMC. The BMC includes a control module and an update module. The first storage circuit includes a first firmware program. The selection circuit is coupled to the first storage circuit and the second storage circuit. The control module obtains the first firmware program from the first storage circuit by the selection circuit and executes the first firmware program when the selection circuit is electrically connected the control module to the first storage circuit. The update module stores a second firmware program in the second storage circuit by the selection circuit according to a firmware update instruction when the selection circuit is electrically connected the update module to the second storage circuit. The BMC is reset after the second firmware program is stored in the second storage circuit. The selection circuit is electrically connected the control module to the second storage circuit and is electrically connected the update module to the first storage circuit after the BMC is reset. The control module obtains the second firmware program from the second storage circuit by the selection circuit and executes the second firmware program.

In an embodiment, a firmware update method includes: obtaining, by a control module of a BMC by a selection circuit, a first firmware program stored in a first storage circuit, and executing the first firmware program when the selection circuit is electrically connected the control module to the first storage circuit; storing, by an update module of the BMC, a second firmware program in a second storage circuit by the selection circuit according to a firmware update instruction when the selection circuit is electrically connected the update module to the second storage circuit, where the BMC is reset after the second firmware program is stored in the second storage circuit; and after the BMC is reset, the control module is electrically connected to the second storage circuit by the selection circuit, to obtain the second firmware program stored in the second storage circuit, and executes the second firmware program.

To sum up, according to the server with a double-firmware storage space and the firmware update method therefor in the present invention, a monitoring operation performed by the BMC and a storage operation for each firmware program are independent of each other. The BMC does not need to stop the monitoring operation in a process of writing each firmware program into a corresponding storage circuit, thereby reducing a risk of damaging the server when the firmware is being updated. Moreover, an updated firmware program and a non-updated firmware program are respectively stored in two storage circuits. When the updated firmware program is damaged, the BMC can further execute the non-updated firmware program, so as to have a backup function.

BRIEF DESCRIPTION OF THE DRAWINGS

The present invention will become more fully understood from the detailed description given herein below for illustration only, and thus are not limitative of the present invention, and wherein.

DETAILED DESCRIPTION

Figure 1:
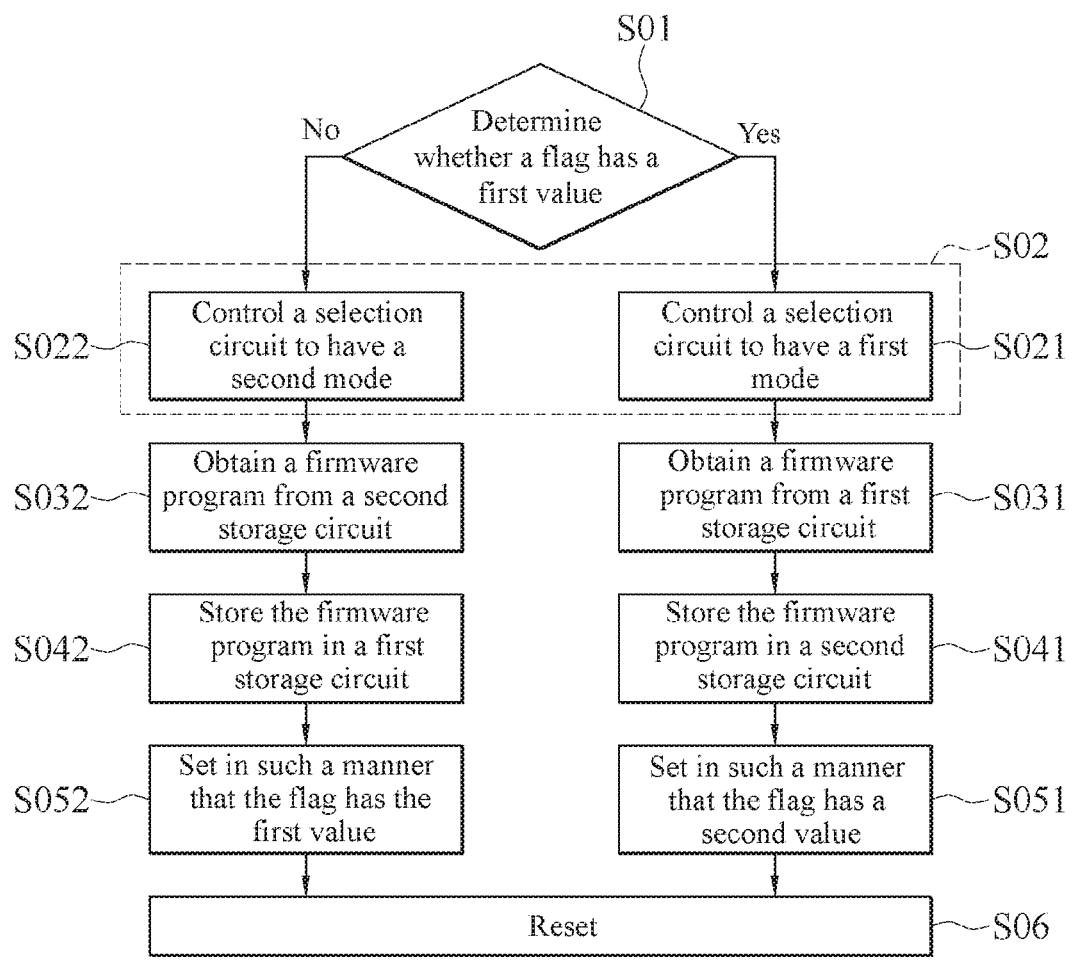
FIG. 1 is a flowchart of an embodiment of a firmware update method according to the present invention.
Figure 2:
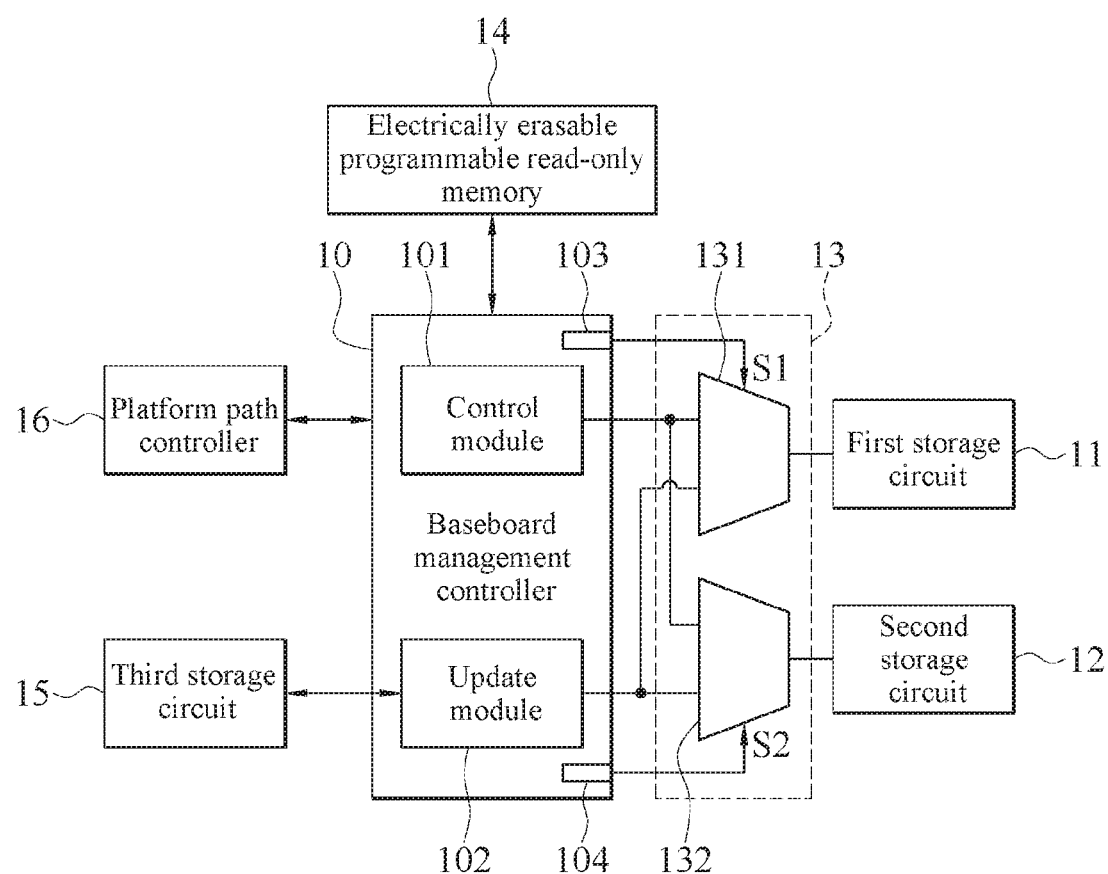
FIG. 2 is a circuit diagram of an embodiment of a server with a double-firmware storage space according to the present invention.
Figure 3:
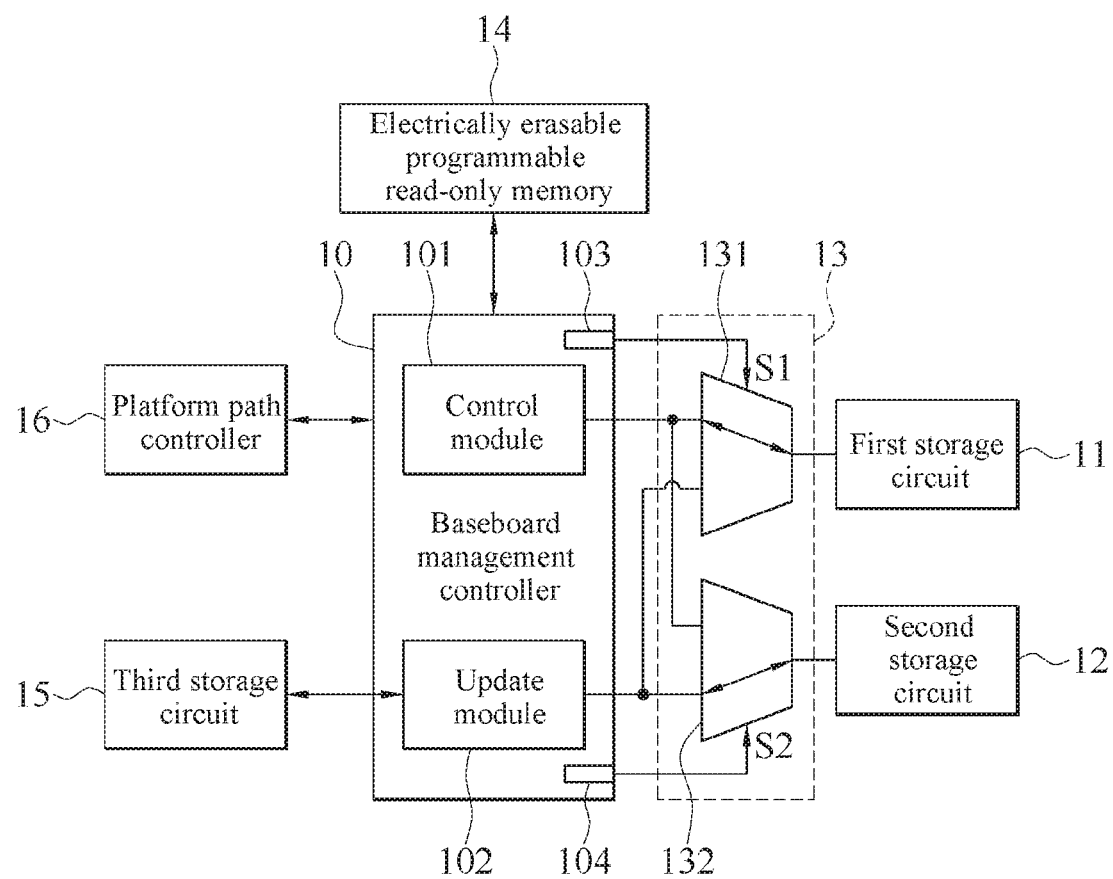
FIG. 3 is a circuit diagram of an embodiment in which a selection circuit in FIG. 2 operates in a first mode.
Figure 4:
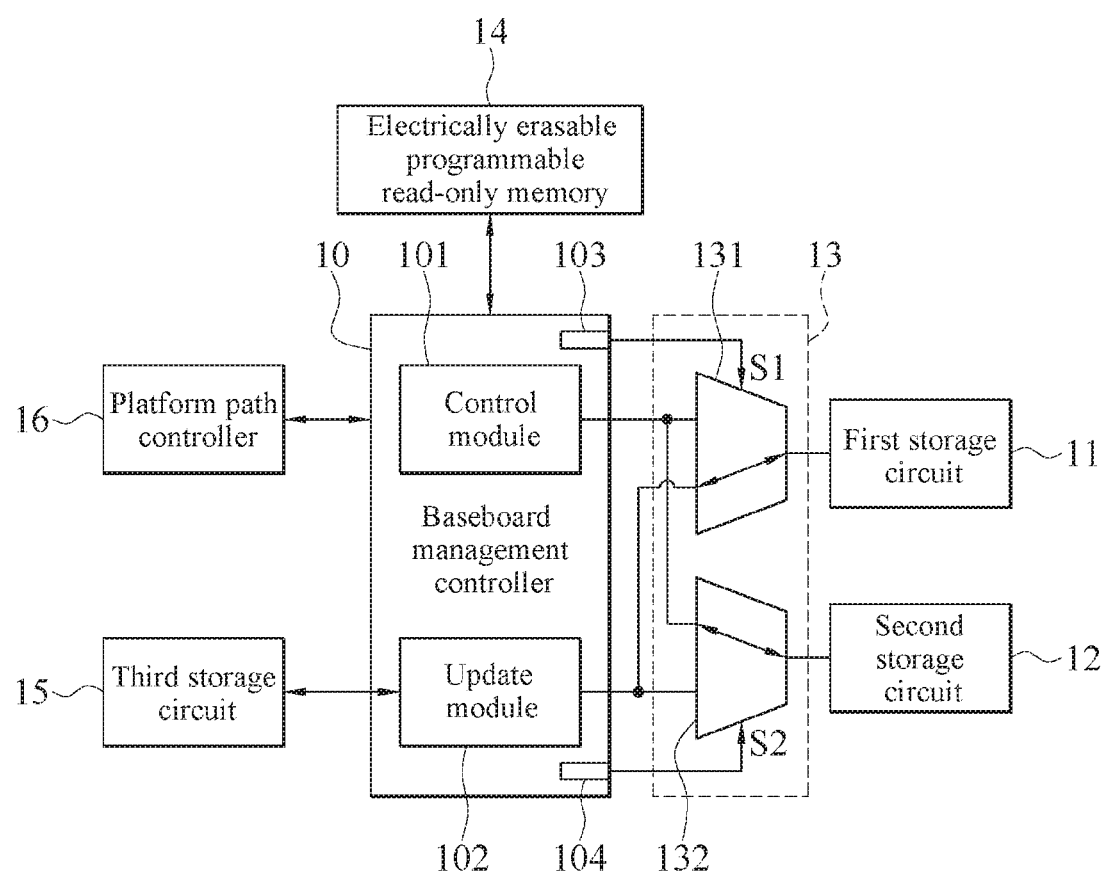
FIG. 4 is a circuit diagram of an embodiment in which a selection circuit in FIG. 2 operates in a second mode.

FIG. 1 is a flowchart of an embodiment of a firmware update method according to the present invention. FIG. 2 is a circuit diagram of a server with a double-firmware storage space according to the present invention. FIG. 3 is a circuit diagram of an embodiment in which a selection circuit 13 in FIG. 2 operates in a first mode. FIG. 4 is a circuit diagram of an embodiment in which a selection circuit 13 in FIG. 2 operates in a second mode. Referring to FIG. 1 to FIG. 4, the server includes a BMC 10, a first storage circuit 11, a second storage circuit 12, and the selection circuit 13. The two storage circuits 11 and 12 may be flashes. The BMC 10 includes a control module 101 and an update module 102. The selection circuit 13 is coupled between the BMC 10 and the first storage circuit 11, and is coupled between the BMC 10 and the second storage circuit 12.

The selection circuit 13 has the first mode and the second mode. After the BMC 10 is powered on, the control module 101 first determines whether a flag has a first value or a second value (step S01). The control module 101 controls a mode of the selection circuit 13 (step S02) according to the first value and the second value of the flag. Specifically, when the flag has the first value, in an example (1), the control module 101 controls the selection circuit 13 to have the first mode (step S021). As shown in FIG. 3, the selection circuit 13 with the first mode is electrically connected the control module 101 to the first storage circuit 11 and is electrically connected the update module 102 to the second storage circuit 12. When the flag has the second value, in an example (0), the control module 101 controls the selection circuit 13 to have the second mode (step S022). As shown in FIG. 4, the selection circuit 13 with the second mode is electrically connected the control module 101 to the second storage circuit 12 and is electrically connected the update module 102 to the first storage circuit 11.

Therefore, the flag may be preset to having the first value. When the flag has the first value, the selection circuit 13 has the first mode according to the first value of the flag. As shown in FIG. 3, the control module 101 is electrically connected to the first storage circuit 11 by the selection circuit 13. A firmware program (for ease of description, the firmware program is referred to as a first firmware program below) is stored in the first storage circuit 11. The control module 101 obtains the first firmware program from the first storage circuit 11 (step S031). The control module 101 executes the first firmware program to initialize hardware of BMC and load and executes another first firmware code according to the first firmware program. In addition, the control module 101 may directly or indirectly monitor each hardware component of the server by an intelligent platform management interface (IPMI).

Further, when the control module 101 executes the first firmware program, a user of the server may transmit a firmware update request. When the BMC 10 receives an instruction (that is, a firmware update instruction) of the firmware update request, the control module 101 performs a firmware storage operation for firmware update. The control module 101 controls the update module 102 to load an updated firmware program (for ease of description, the updated firmware program is referred to as a second firmware program below). In one embodiment, the update module 102 can be a specific module in the BMC 10. In one embodiment, the update module 102 can be a module dynamically assigned from one of the BMC 10's modules. That is, once the BMC 10 receives the firmware update instruction, the BMC 10 is triggered to evaluate the loading and function of each of the BMC 10's modules, and then the BMC 10 will assign one of those modules as the update module 102. In one embodiment, the module which is not assigned a specific function and has the lowest loading will be assigned as the update module 102, and the loading of the assigned module will be redistributed to other module(s) in the BMC 10. After the update module 102 is assigned, the BMC 10 will establish the communication between the assigned update module 102 and the selection circuit 13. The update module 102 sends the second firmware program to the second storage circuit 12 by the selection circuit 13, so as to store the second firmware program in the second storage circuit 12 (step S041) to complete the firmware storage operation. In addition, after the BMC 10 receives the firmware update instruction, the control module 101 sets in such a manner that the flag has the second value (step S051), so that the flag is changed from having the first value to having the second value. The BMC 10 is reset after the control module 101 completes setting the flag and the second firmware program is stored in the second storage circuit 12 (step S06).

The control module 101 performs step S01 again after the BMC 10 is reset, so as to determine whether the flag has the first value. Before the BMC 10 is reset, the control module 101 has set in such a manner that the flag has the second value. Therefore, when performing step S01, the control module 101 determines that the flag does not have the first value, but has the second value (a determining result is no), so that the control module 101 controls the selection circuit 13 to have the second mode (step S022). As shown in FIG. 4, the control module 101 is electrically connected to the second storage circuit 12 according to the selection circuit 13 with the second mode. The control module 101 reads the second storage circuit 12 and obtains the updated second firmware program from the second storage circuit 12 (step S032). The control module 101 executes the updated second firmware program to directly or indirectly monitor each hardware component of the server in the operating system.

Similarly, when the control module 101 executes the second firmware program, if the user of the server transmits another firmware update request, when the BMC 10 receives an instruction of the firmware update request, the control module 101 performs another firmware storage operation for firmware update. The control module 101 controls the update module 102 to load another updated firmware program (for ease of description, the updated firmware program is referred to as a third firmware program below). The update module 102 sends the third firmware program to the first storage circuit 11 through the selection circuit 13, so as to store the third firmware program in the first storage circuit 11 (step S042) to overwrite the relatively old first firmware program in the first storage circuit 11, thereby completing the another firmware storage operation. In addition, after the BMC 10 receives the firmware update instruction, the control module 101 sets in such a manner that the flag has the first value (step S052), so that the flag is changed from having the second value to having the first value. The BMC 10 is reset after the control module 101 completes setting the flag and the third firmware program is stored in the first storage circuit 11 (step S06). The control module 101 performs step S01 again after the BMC 10 is reset. Details are not described herein again.

Based on the above, in a process in which the update module 102 stores the second firmware program in the second storage circuit 12, at the same time, the control module 101 may continue to execute the first firmware program without being affected. Further, in a process in which the update module 102 stores the third firmware program in the first storage circuit 11, meanwhile, the control module 101 may also continue to execute the second firmware program without being affected. That is, a monitoring operation performed by the BMC 10 and a firmware storage operation for firmware update are independent of each other. The BMC 10 does not need to stop the monitoring operation in a process of storing the firmware program in either of the storage circuits 11 and 12. For example, the BMC 10 can further control a speed of a fan by monitoring a system temperature when performing the firmware storage operation, thereby reducing a risk of damaging the server during the period that the firmware is being updated. Moreover, an updated firmware program and a non-updated firmware program are respectively stored in the two storage circuits 11 and 12. When the updated firmware program is damaged, the BMC 10 can further execute the non-updated firmware program, so as to have a backup function. The BMC 10 can execute the non-updated firmware program, so as to reload a to-be-updated firmware program, thereby repairing the foregoing damaged firmware program. For example, if the control module 101 determines that the second firmware program from the second storage circuit 12 is damaged when executing the second firmware program, the control module 101 controls the selection circuit 13 to be electrically connected the control module 101 to the first storage circuit 11. The control module 101 obtains the first firmware program from the first storage circuit 11 and executes the first firmware program.

In an embodiment, in step S041 and step S042, when the firmware storage operation for firmware update that is performed by the BMC 10 is completed (that is, the storage operation on the second firmware program in the second storage circuit 12 is completed or the storage operation on the third firmware program in the first storage circuit 11 is completed), the update module 102 may send a firmware update complete signal, and the control module 101 may determine, according to whether the firmware update complete signal is received, whether a firmware update operation is completed. When the control module 101 receives the firmware update complete signal, the control module 101 starts resetting (step S06).

In addition, the control module 101 may first determine whether the flag has the first value in step S01. When the flag does not have the first value, the control module 101 further determines whether the flag has the second value, so as to determine whether the flag has the first value or the second value. Further, when the control module 101 determines that the flag does not have the first value or the second value, the control module 101 may generate an error message.

In an embodiment, the server may further include an electrically erasable programmable read-only memory 14 (EEPROM) (which is referred to as a ROM 14 for short below). The ROM 14 may store the flag. After the BMC 10 is powered on, the control module 101 reads the ROM 14 when performing step S01, to determine whether the flag has the first value or the second value. Moreover, when the BMC 10 receives the firmware update instruction, the control module 101 writes the ROM 14 when performing step S051 and step S052, to change the value of the flag in the ROM 14. Further, the server may further include another storage circuit 15 (which is referred to as a third storage circuit 15 below) coupled to the update module 102. Using that the user transmits the firmware update request when the control module 101 executes the first firmware program as an example, after the firmware update request is received by the BMC 10, the third storage circuit 15 may store the second firmware program, and the update module 102 may load the second firmware program from the third storage circuit 15 when performing step S041. Specifically, before transmitting the firmware update request, the user may use software tools of the server to directly transmit the updated second firmware program to the BMC 10, or transmit the updated second firmware program to the BMC 10 through a remote user interface (UI) by a network. The BMC 10 first stores the second firmware program in the third storage circuit 15. When the control module 101 receives an instruction of the firmware update request that transmits by the user, the update module 102 of the BMC 10 loads the second firmware program from the third storage circuit 15 to perform step S041.

Moreover, the server further includes a platform controller hub 16 coupled to the BMC 10. When the BMC 10 is reset, the platform controller hub 16 is not reset. That is, the platform controller hub 16 and other components in the server that are controlled by the platform controller hub 16 are not affected by resetting of the BMC 10 for the firmware update. The platform controller hub 16 and the other components may continue to perform a function instruction set thereof, such as a network connection function, a sound effect play function, and a universal serial bus (USB) transmission function. That is to say, no matter during performing the firmware storage operation, or when the BMC 10 is reset after the firmware update, or the period that the BMC 10 reinitializes and execute the updated BMC firmware, the platform controller hub 16 is not affected. Since the platform controller hub 16 is not affected, the operating system will not reboot and the other components in the server may continue to work without interruption. Only the BMC 10 is separately reset without affecting an operation of the server. Therefore, during a time period in which the BMC 10 is reset and after the BMC 10 is reset, the platform controller hub 16 does not need to be reset. The server can still receive an operation instruction of the user and perform an action corresponding to the operation instruction as usual.

In an embodiment, the selection circuit 13 may include a multiplexer or a switch. Using that the selection circuit 13 includes a multiplexer as an example, as shown in FIG. 2 to FIG. 4, the selection circuit 13 may include a first multiplexer 131 and a second multiplexer 132. In addition, the BMC 10 includes two general-purpose input/output (GPIO) pins 103 and 104, respectively coupled to the first multiplexer 131 and the second multiplexer 132. Based on the above, in step S021, the BMC 10 may use the GPIO pin 103 to output a first control signal S1 to the first multiplexer 131, so as to control the first multiplexer 131 to be electrically connected the control module 101 to the first storage circuit 11, and use the GPIO pin 104 to output a second control signal S2 to the second multiplexer 132, so as to control the second multiplexer 132 to be electrically connected the update module 102 to the second storage circuit 12, so that the selection circuit 13 has the first mode. In step S022, the BMC 10 may use the GPIO pin 103 to output an inverted first control signal S1, so as to control the first multiplexer 131 to be electrically connected the update module 102 to the first storage circuit 11, and use the GPIO pin 104 to output an inverted second control signal S2, so as to control the second multiplexer 132 to be electrically connected the control module 101 to the second storage circuit 12, so that the selection circuit 13 has the second mode.

To sum up, according to the server with a double-firmware storage space and the firmware update method therefor in the present invention, a monitoring operation performed by the BMC and a storage operation for each firmware program are independent of each other. The BMC does not need to stop the monitoring operation in a process of writing each firmware program into a corresponding storage circuit, thereby reducing a risk of damaging the server when the firmware is being updated. Moreover, an updated firmware program and a non-updated firmware program are respectively stored in two storage circuits.

When the updated firmware program is damaged, the BMC can further execute the non-updated firmware program, so as to have a backup function.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A server with a double-firmware storage space, comprising:
   a first storage circuit, comprising a first firmware program;
   a second storage circuit;
   a selection circuit, comprising a first multiplexer and a second multiplexer coupled to the first storage circuit and the second storage circuit; and
   a baseboard management controller (BMC), comprising:
      a control module, coupled to the first multiplexer and the second multiplexer, and obtaining the first firmware program from the first storage circuit by the first multiplexer and executing the first firmware program to execute a monitoring operation of the server when the first multiplexer electrically connects the control module to the first storage circuit; and
      an update module, coupled to the first multiplexer and the second multiplexer, and storing a second firmware program in the second storage circuit by the second multiplexer to execute a firmware storage operation according to a firmware update instruction when the second multiplexer electrically connects the update module to the second storage circuit, wherein
   when the update module executes the firmware storage operation, the control module executes the monitoring operation independently;
   after the second firmware program is stored in the second storage circuit, the update module sends a firmware update complete signal to the control module, and the control module starts resetting which resets the BMC according to the firmware update complete signal;
   the second multiplexer electrically connects the control module to the second storage circuit and the first multiplexer electrically connects the update module to the first storage circuit after the BMC is reset; and
   the control module obtains the second firmware program from the second storage circuit by the second multiplexer and executes the second firmware program to execute the monitoring operation.

2. The server with a double-firmware storage space according to claim 1, wherein after the BMC is powered on, the control module controls, according to a preset first value of a flag, the selection circuit to electrically connect the control module to the first storage circuit and to electrically connect the update module to the second storage circuit; and
   after the BMC is reset, the control module controls, according to a second value of the flag, the selection circuit to electrically connected the control module to the second storage circuit and to electrically connect the update module to the first storage circuit.

3. The server with a double-firmware storage space according to claim 2, wherein before the BMC is reset, the control module sets, according to the firmware update instruction, in such a manner that the flag is changed from the first value to the second value.

4. The server with a double-firmware storage space according to claim 1, wherein;
   after the BMC is powered on, according to a preset first value of a flag, the control module controls the first multiplexer to electrically connected the control module to the first storage circuit and controls the second multiplexer to be electrically connected the update module to the second storage circuit; and
   after the BMC is reset, according to a second value of the flag, the control module controls the second multiplexer to electrically connect the control module to the second storage circuit and controls the first multiplexer to electrically connect the update module to the first storage circuit.

5. The server with a double-firmware storage space according to claim 4, wherein before the BMC is reset, the control module sets, according to the firmware update instruction, in such a manner that the flag is changed from the first value to the second value.

6. The server with a double-firmware storage space according to claim 1, further comprising a platform path controller, coupled to the BMC, wherein when the BMC is reset, the platform controller hub is not reset.

7. The server with a double-firmware storage space according to claim 1, wherein when the control module executes the second firmware program, the update module stores a third firmware program in the first storage circuit according to another firmware update instruction, wherein the update module overwrites the first firmware program with the third firmware program.

8. The server with a double-firmware storage space according to claim 1, wherein if the control module determines that the second firmware program is damaged when executing the second firmware program, the control module obtains the first firmware program from the first storage circuit by the selection circuit and executes the first firmware program.

9. The server with a double-firmware storage space according to claim 1, further comprising a third storage circuit, coupled to the update module, wherein the update module obtains the second firmware program from the third storage circuit according to the firmware update instruction.

10. A firmware update method, applied to a server, wherein the firmware update method comprises:
    obtaining, by a control module of a baseboard management controller (BMC) by a first multiplexer of a selection circuit, a first firmware program stored in a first storage circuit, and executing the first firmware program to execute a monitoring operation of the server when the first multiplexer electrically connects the control module to the first storage circuit;
    storing, by an update module of the BMC, a second firmware program in a second storage circuit by a second multiplexer of the selection circuit to execute a firmware storage operation according to a firmware update instruction when the second multiplexer electrically connects the update module to the second storage circuit, wherein
    when the update module executes the firmware storage operation, the control module executes the monitoring operation independently;
    after the second firmware program is stored in the second storage circuit, the update module sends a firmware update complete signal to the control module, and the control module starts resetting which resets the BMC according to the firmware update complete signal; and after the BMC is reset, the control module is electrically connected to the second storage circuit by the second multiplexer to obtain the second firmware program stored in the second storage circuit, and executes the second firmware program to execute the monitoring operation.

11. The firmware update method according to claim 10, further comprising:

after the BMC is powered on, controlling, by the control module according to a preset first value of a flag, the selection circuit to electrically connect the control module to the first storage circuit and to electrically connect the update module to the second storage circuit; and after the BMC is reset, controlling, by the control module according to a second value of the flag, the selection circuit to electrically connect the control module to the second storage circuit and to electrically connect the update module to the first storage circuit.

12. The firmware update method according to claim 11, wherein before the BMC is reset, the firmware update method further comprises: setting the flag to the second value by the control module according to the firmware update instruction.

13. The firmware update method according to claim 10, further comprising:

after the BMC is powered on, according to a preset first value of a flag, controlling, by the control module, the first multiplexer of the selection circuit to electrically connect the control module to the first storage circuit and controlling the second multiplexer of the selection circuit to electrically connect the update module to the second storage circuit; and after the BMC is reset, according to a second value of the flag, controlling, by the control module, the second multiplexer of the selection circuit to electrically connect the control module to the second storage circuit and controlling the first multiplexer of the selection circuit to electrically connect the update module to the first storage circuit.

14. The firmware update method according to claim 13, wherein before the BMC is reset, the firmware update method further comprises: setting the flag to the second value by the control module according to the firmware update instruction.

15. The firmware update method according to claim 10, wherein in the step of the BMC is reset, a platform controller hub coupled to the BMC is not reset when the BMC is reset.

16. The firmware update method according to claim 10, further comprising: when the control module executes the second firmware program, the update module is electrically connected to the first storage circuit by the selection circuit, storing, by the update module, a third firmware program in the first storage circuit by the selection circuit according to another firmware update instruction, wherein the first firmware program is overwritten with the third firmware program.

17. The firmware update method according to claim 10, further comprising: if the control module determines that the second firmware program is damaged when executing the second firmware program, obtaining, by the control module, the first firmware program from the first storage circuit by the selection circuit and executing the first firmware program.

18. The firmware update method according to claim 10, wherein in the step of storing, by an update module, a second firmware program in a second storage circuit by the selection circuit according to a firmware update instruction, the update module obtains the second firmware program from a third storage circuit according to the firmware update instruction.

* * * * *